UNITED STATES PATENT OFFICE.

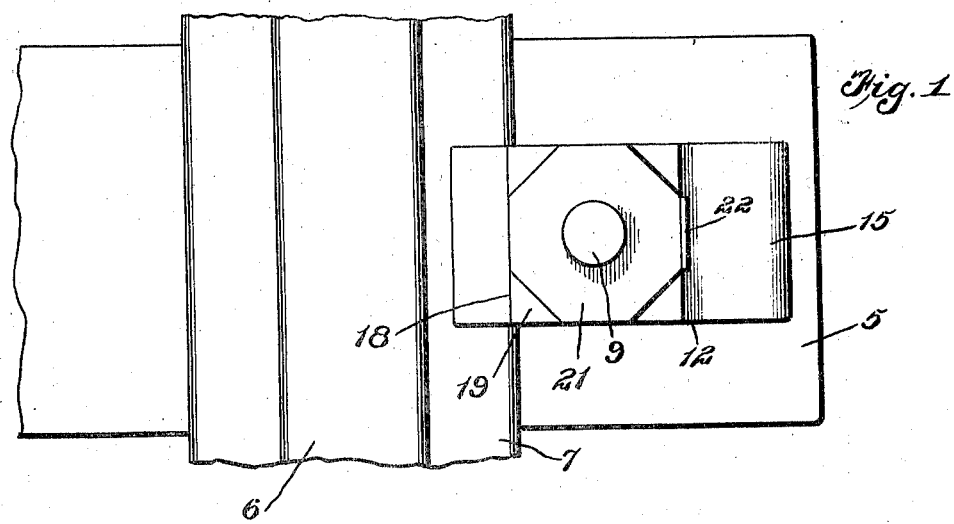
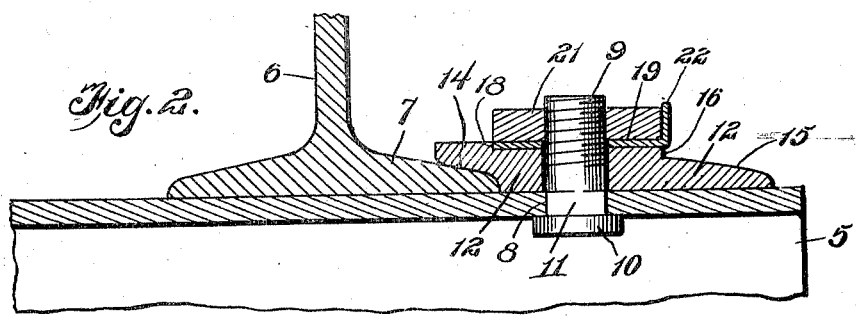
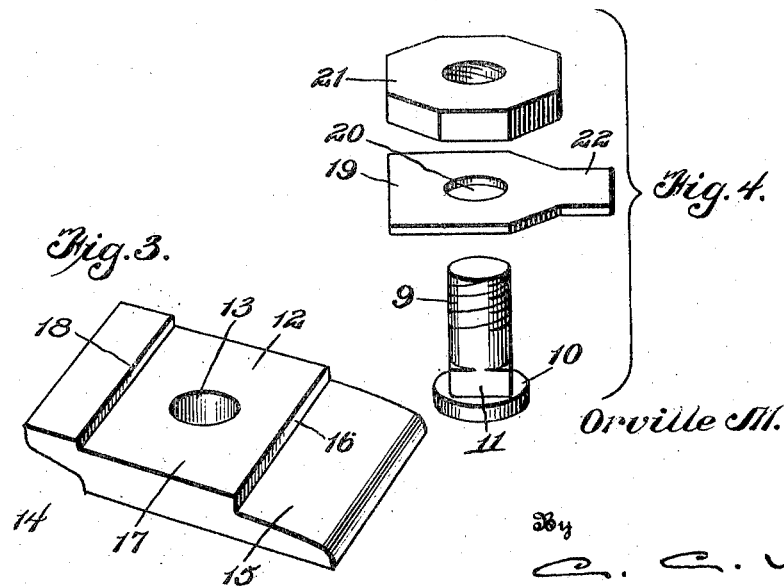
Inventor:
Orville M. Knox,

ORVILLE M. KNOX, OF KNOXBORO, NEW YORK.

RAIL-FASTENER.

1,315,132.     Specification of Letters Patent.     Patented Sept. 2, 1919.

Application filed May 14, 1919. Serial No. 297,055.

*To all whom it may concern:*

Be it known that I, ORVILLE M. KNOX, a citizen of the United States, residing at Knoxboro, in the county of Oneida and State of New York, have invented new and useful Improvements in Rail-Fasteners, of which the following is a specification.

This invention relates generally to railway rail fasteners, having particular reference to fasteners of the character disclosed in my United States Patent No. 948,375, granted February 8, 1910.

The device disclosed in the patent mentioned, while for the most part very effective and efficient for its purposes, does not enable as fine an adjustment of the securing nut to be made as to reach the height of efficiency, in that the square nut used with such device must be turned so that one of the flat faces thereof is brought into alinement with the fulcrum shoulder near the outer end of the rail clamping member. With the use of square nuts, such adjustment may not always be made, as it frequently happens that the nut when turned upon the bolt to its downward limit has one of its flat faces disposed at an angle to the fulcrum shoulder. Upon bending up of the locking tongue near the outer end of the locking plate, this tongue will obviously not engage the entire flat surface of the nut, and the latter is thereby permitted to move in retrograde direction such distance as will cause the clamping elements to slightly loosen. This is objectionable, in that the rail is not clamped as tightly as necessity demands, and it is the primary object of the present invention to provide means whereby this objection is overcome. Furthermore, in the device disclosed in the patent, it is possible for the bolt to turn independently of the clamping and locking means, such movement being caused by the constant pounding of car wheels as they travel over the rail, and it is the important object of this invention to overcome this objection.

In the accomplishment of these objects, a polygonal nut is used in connection with the bolt, and it is preferred that the nut be provided with eight or more sides of equal length, and the locking plate has its operative end reduced in width to correspond with the length of each of the numerous faces of the nut. By so constructing the nut and locking plate, very fine adjustment may be obtained, in that it requires but a small amount of movement of the nut to move one of the sides thereof out of alinement with the fulcrum shoulder and the next adjacent side into alinement. It will be understood that the more faces provided in the nut, the less the amount of movement required for such action. The locking device in the present instance is shown as used in connection with a metallic railway tie, having an opening therein provided with angularly disposed walls to receive the securing bolt, and the latter is shaped near its head end to correspond to the shape of the opening and to snugly fit within the latter, and when the clamping nut is secured upon the bolt and screwed downwardly the bolt will be caused to seat firmly in the opening and rotary movement of the said bolt will be prevented.

The invention consists of the features of construction, combination and arrangement of parts hereinafter fully described and claimed, reference being had to the accompanying drawing, in which:

Figure 1 is a top plan view of a fragment of railway rail and tie and illustrating the application of rail retaining means constructed in accordance with the invention, Fig. 2 is a longitudinal sectional view taken through the tie end and showing the clamping means in section, Fig. 3 is a detail perspective view of the clamping plate, and Fig. 4 is a perspective view of the bolt, clamping plate and nut, all slightly separated.

Referring now more particularly to the drawing, 5 indicates a metallic railway tie of conventional form, upon which rests the rail 6. The tie is provided at a point slightly beyond the longitudinal edge of the base 7 of the rail with an opening 8 having angular walls. This opening may be provided with four or more walls. The bolt for securing the clamping elements to the tie and upon the rail base is indicated at 9, and is inserted through the opening 8 so that the head 10 thereof will be disposed beneath the tie top, and this bolt near its head end is provided with angular walls 11 conforming to the shape and number of the walls in the opening 8. When the bolt is properly inserted in the opening the angular faces thereof will snugly fit with the corresponding walls of the opening 8, whereby rotary movement of the bolt within said opening will be prevented.

The clamping member is indicated at 12, and comprises the rectangular oblong body as shown, having a central aperture 13 to receive the bolt 9, and being of such length as when disposed longitudinally of the tie to have its inner end extend over the adjacent edge of the base flange 7 of the rail. This member is cut away upon its underside near its inner end as at 14 to conform to the shape of the base flange and to snugly fit upon the latter. The upper surface of the clamp member near the outer end is provided with a rounded fulcrum face 15 in a plane below the upper face of the clamping member, and a transverse wall 16 connects this fulcrum face with an upper depressed flat face 17 upon the clamping member. This depressed surface communicates at its inner end with an upstanding shoulder 18, the shoulder 18 and wall 16 being preferably spaced equal distances from the central bolt receiving opening 13 in the clamping member, and the said shoulder and wall are parallel with each other and with the ends of the clamping member.

The clamping or locking plate is indicated at 19, and is provided with a central opening 20 to receive the bolt 9. This plate may be formed of thin metal, and is preferably of a width equal to the width of the clamping member 12, the opening 20 therein being so positioned that when the bolt 9 is extended therethrough the inner edge of the plate will be in engagement with the shoulder 18 at the inner end of the member 12. The nut to be applied to the bolt 9 to secure the various parts in position is indicated at 21, and, as shown, is of polygonal shape. In the present instance this nut has eight surfaces of equal length, and when this nut is turned upon the bolt so that any of its sides are disposed parallel with the ends of the member 12, the opposed parallel faces of nut will aline with the shoulders 18 and 16 of the clamping member. The clamping plate 19 is preferably of a thickness equal to the depth of the wall or shoulder 18, so that the nut 21 may not pass below the upper face of the clamp member, and the outer end of this plate is reduced in width so as to provide a locking tongue 22 of a width equal to the length of each of the angularly disposed faces of the nut. Normally, this tongue projects outwardly beyond the shoulder or wall 16 of the clamping member, and by inserting an instrument between this outwardly projecting tongue and the fulcrum surface 15 and applying prying movement to such instrument, the tongue 22 may be easily bent upward so as to be disposed at right angles to the body portion of the plate 19. The line of bend of the tongue 22 will be determined by the adjacent flat face of nut 21, and it will be understood that this tongue will engage the said adjacent flat face of the nut throughout the length and depth of the latter.

When the bolt is applied to the tie in the manner stated and the clamp member, plate and nut are secured thereover, rotary movement is applied to the nut so as to cause the parts to be drawn together. The bolt is thus drawn into the opening 8 in the tie so that the angular portion 11 of the bolt will be firmly seated in the correspondingly shaped opening in the tie, and rotary movement of the bolt will be prevented. When the nut has been moved upon the bolt sufficiently to cause the clamping member 12 to be firmly engaged with the rail base, the outwardly projecting tongue 22 may be bent upwardly in the manner stated so as to prevent retrograde movement of the nut. By using a nut having many sides, it is possible to obtain fine adjustment as but slight movement of the nut is required to bring the various angular faces thereof into alinement with the fulcrum shoulder 16. Slippage or slight rotary movement of the clamping member 19 is prevented, in that the inner straight edge of the latter is engaged throughout its extent with the upstanding shoulder 18 of the clamping member.

Having thus fully described my invention, I claim:—

In a rail fastening device, a tie having an opening therein, a bolt extending upwardly through said opening, an oblong rectangular clamp member having a rectangular seat face and an opening extending therethrough to receive said bolt, a transverse locking shoulder on said seat face near the rail base engaging end of the clamp, a fulcrum surface near the opposite end of said clamp and in a plane lower than said seat face, a transverse shoulder at the juncture of the seat face and said fulcrum surface and parallel with said locking shoulder, a locking plate resting on the seat face and having an opening for passage of the bolt, said locking plate having a straight transverse edge engaging said transverse locking shoulder, two straight parallel side edges at right angles to said locking edge and lying flush with the side edges of the seat face, said plate having its portion opposite its locking edge formed to provide a pair of forwardly and outwardly converging oblique edges and a tongue extending outwardly from the point of convergence of said edges, and a nut engaging the bolt and bearing on the locking plate, said nut having a plurality of angular sides of such number that in any position of the bolt one side will bear against the transverse locking shoulder, two of the sides thereof will lie flush with the sides of the locking shoulder, two of the sides will lie flush with the oblique edges of the locking plate and one side thereof will lie in vertical alinement with the tongue of the locking plate, whereby the latter may be bent upwardly into locking engagement with said last mentioned side.

In testimony whereof I affix my signature.

ORVILLE M. KNOX.